April 24, 1934.  E. C. KNUTH  1,956,462

METHOD OF MAKING COMPOSITE STRIPS

Original Filed Jan. 7, 1930  2 Sheets-Sheet 1

INVENTOR.
Edward C. Knuth
BY
Pay, Oberlin & Pay
ATTORNEYS.

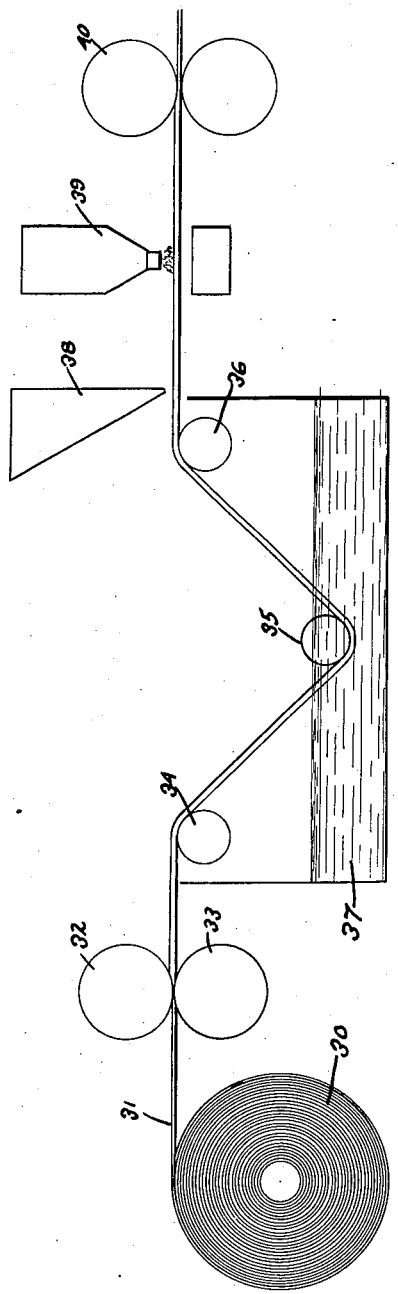

Patented Apr. 24, 1934

1,956,462

UNITED STATES PATENT OFFICE 1,956,462

METHOD OF MAKING COMPOSITE STRIPS

Edward C. Knuth, Cleveland, Ohio, assignor to The Cleveland Graphite Bronze Company, Cleveland, Ohio, a corporation of Ohio Application January 7, 1930, Serial No. 419,050
Renewed February 23, 1934

6 Claims. (Cl. 29—189)

The present invention, relating as indicated to composite strips and a method of making same, is particularly directed to the manufacture of composite metal strips consisting of two metals of different melting points and is intended particularly, although not exclusively, for the making of composite strips of such metals, for example, as steel and brass or bronze for the subsequent manufacture therefrom of rolled sheet metal bearings. The principal object of the present invention is the provision of a simple and effective method for integrally uniting a metal such as brass or bronze to a rolled steel strip. To the accomplishment of the foregoing and related ends, said invention, then, consists of the means hereinafter fully described and particularly pointed out in the claims.

The annexed drawings and the following description set forth in detail certain means and one mode of carrying out the invention, such disclosed means and mode illustrating, however, but one of various ways in which the principle of the invention may be employed.

Figure 1:
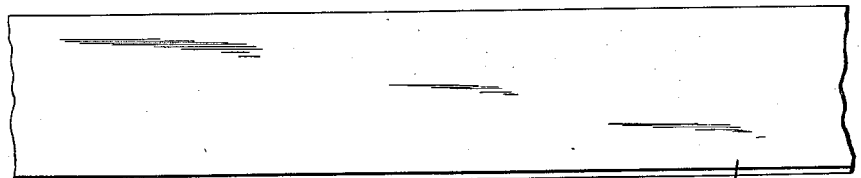
Figure 2:
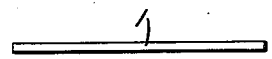
Figure 3:
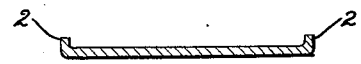
Figure 4:
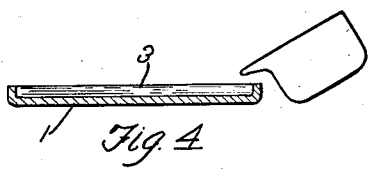
Figure 5:
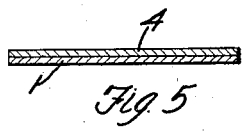
Figure 6:
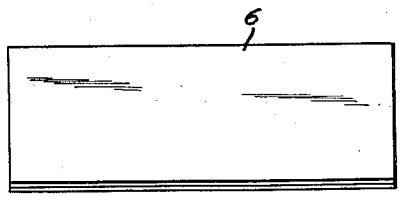
Figure 7:
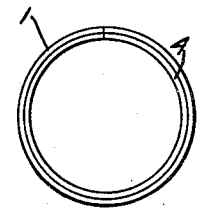
Figure 8:
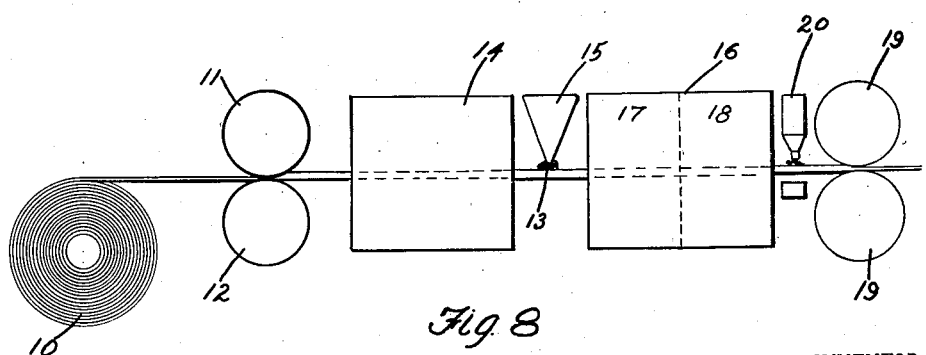

In said annexed drawings:

Fig. 1 is plan view of the base strip of my improved composite strip; Fig. 2 is a transverse section through the base strip to which a metal of lower melting point is to be applied; Fig. 3 is a similar view of the same strip after forming to receive the metal of lower melting point; Fig. 4 is a view of the strip of Fig. 5 filled between its flanges with the metal of lower melting point; Fig. 5 is a similar view showing the two metals bonded together with the preformed flanges of the base strip removed; Fig. 6 is a view in perspective of a rectangular blank cut from the composite strip of Fig. 5 for formation into a cylinder; Fig. 7 is an end view of a cylindrical bearing formed of the composite blank of Fig. 6; Fig. 8 is a side elevation more or less diagrammatic in character illustrating the successive steps in the application of the metal of lower melting point to the metal of higher melting point; and Fig. 9 is a view similar to Fig. 8, but showing the modification of the apparatus there shown.

Many attempts have been made to integrally unite such metals, for example, as steel and either brass or bronze, for the purpose of providing a relatively thin and hence inexpensive surface coating of an expensive soft bearing metal, such as bronze, backed by a strong and relatively inexpensive supporting metal, such as steel. The advantages of such composite sheet of metal for various purposes are obvious. Such a metal as brass or bronze is non-rusting and is well adapted for such purposes as the support of rotating shafts, and the like, but has a disadvantage of being relatively expensive. If a thin coating of this metal can be integrally united to a relatively inexpensive strong metal, such as steel, the composite strip will be ideally adapted to the manufacture of bearings and will be relatively inexpensive. At the same time numerous other uses for such a composite strip will suggest themselves to those familiar with the various arts.

I have devised a method of integrally and uniformly uniting a thin layer of brass, bronze or other metal of relatively low melting point to a strip of a tough, strong, metal, such as steel, of a relatively high melting point. My improved method, briefly stated, consists in forming upturned flanges along the edges of a strip of steel, pouring molten brass onto the steel strip between these retaining flanges while maintaining a non-oxidizing atmosphere around the molten material, cooling the same to solidify the brass, removing the flanges, and then working the bonded composite strip into such forms and articles as may be desired.

Referring now to Fig. 1, I have shown a strip 1 which may be of steel or other material of higher melting point than the metal to be applied thereto, and throughout the present description it may be understood that the term "steel" includes any metal used for the support or backing of the strip, while "brass" is used to include any metal of lower melting point than the supporting strip. This strip 1 is first formed with upturned flanges 2 produced in any desired manner, after which molten brass 3 is poured onto the upper surface of the strip 1 to completely cover the same. The flanges 2 serve either to meter the depth of the brass on the strip 1 or merely as guards to prevent accidental overflow, depending upon whether an extremely thin coating of brass is desired or a coating of some considerable thickness. After the solidification of the brass, the flanges 2 are removed, leaving the strip in the condition shown in Fig. 5, in which the steel strip 1 has bonded thereto a second strip 4 of brass which is integrally and uniformly united all over one surface of the steel.

This composite strip or sheet may then be worked or formed into whatever articles it is desired to manufacture, and I have here illustrated a rectangular blank 6 cut from the strip of Fig. 5 for formation into a cylindrical bearing. The cylindrical bearing is shown in Fig. 7 and has the steel strip 1 on the outside and the brass strip 4 on the inside, but it will be understood that this represents but one of many articles which may be formed from the strips in question.

One form of apparatus for carrying out the present method is diagrammatically shown in Fig. 8. In this figure there is shown a coil 10 of steel strip, from which the steel is uncoiled, and then pressed between forming rolls 11 and 12, which form the flanges 2 on the steel strip. The steel strip is then preheated to a predetermined temperature, approximating that of the melting point of the particular brass to be applied thereto in a suitable furnace 14 or by any other suitable means. Molten brass 13 is allowed to flow onto the surface of the preheated steel strip from a melting furnace 15, after which the steel strip with the molten brass on the surface is passed through a furnace 16, in which a non-oxidizing atmosphere is maintained. This furnace 16 may be provided with separate compartments 17 and 18, the compartment 18 serving as a cooling compartment and permitting the brass to solidify just prior to its passage out of the furnace. The composite strip issuing from the furnace is then passed between rolls 19 and may subsequently either be rolled down for sizing or, if necessary, the surfaces of the strip may be machined for greater accuracy.

The solidification of the brass may be also effected or hastened if desired by passing the lined strip either through a water bath or under a water spray 20 positioned just beyond the cooling furnace 18. The rolls 19 act as pulling rolls for assisting the rolls 11 and 12 to pass the strip through the furnace.

In Fig. 9 I have shown another form of apparatus for carrying out the present invention which has the advantage of materially shortening the time required for bringing the backing or reinforcing strip to the desired predetermined temperature. In this apparatus I employ a coil of strip steel 30 which is suitably mounted and from which the strip 31 is first passed through forming rolls 32 and 33 which form the parallel upturned flanges on the edges of the strip. The strip is then passed over rolls 34, 35 and 36 and is thus carried through a molten bath 37 of any suitable material which may, for example, be brass for immediately bringing the temperature of the strip to the desired temperature for bonding thereto the brass lining. The passage of the strip through such a bath has the additional advantage of placing a very thin coating on the edges and back of the strip which prevents corrosion.

The strip, after it leaves the bath 37, passes under the pouring spout 38 from which molten brass is poured into the strip between the edge flanges, after which this molten brass is immediately solidified by means of a water-spray from a tank 39. The composite brass and steel strip is then drawn out by means of rolls 40, and after having the flanges removed, if desired, it is sized or drawn down to any desired dimensions.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:

1. A method of making composite metal strips, which consists in forming flanges on the edges of a steel strip, pouring molten brass onto the surface thereof between said flanges, and then maintaining the same in a reducing atmosphere during solidification of the brass.

2. A method of making composite metal strips, which consists in forming flanges on the edges of a steel strip, pouring molten brass onto the surface thereof between said flanges, maintaining the same in a reducing atmosphere during solidification of the brass, removing said flanges, and drawing said strip to harden the brass therein.

3. In a continuous method of making composite metal strips, the steps of forming flanges on the edges of a continuous steel strip, longitudinally moving said strip with said flanges directed upwardly, and pouring molten metal on the surface of said strip while in motion.

4. In a continuous method of making composite metal strips, the steps of forming flanges on the edges of a continuous steel strip, longitudinally moving said strip with said flanges directed upwardly, pouring molten metal on the surface of said strip while in motion, and then removing said flanges.

5. In a continuous method of making composite metal strips, the steps of forming flanges on the edges of a continuous steel strip, passing said strip through a bath of molten metal, longitudinally moving said strip with said flanges directed upwardly, and pouring molten metal on the surface of said strip while in motion.

6. In a continuous method of making composite metal strips, the steps of forming flanges on the edges of a continuous steel strip, passing said strip through a bath of molten metal, longitudinally moving said strip with said flanges directed upwardly, pouring molten metal on the surface of said strip while in motion, and then removing said flanges.

EDWARD C. KNUTH.